US007788597B1

(12) United States Patent
Mazhar et al.

(10) Patent No.: US 7,788,597 B1
(45) Date of Patent: Aug. 31, 2010

(54) WINDOWS RADIO TOOLBAR

(75) Inventors: Khurshed Mazhar, Kirkland, WA (US);
David M. Nadalin, Redmond, WA (US);
Kevin P. Larkin, Mercer Island, WA (US); Kevin Warne

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/411,171

(22) Filed: Oct. 1, 1999
(Under 37 CFR 1.47)

(51) Int. Cl.
*G06F 13/00* (2006.01)
*G06F 15/00* (2006.01)
(52) U.S. Cl. ...................... 715/810; 715/779
(58) Field of Classification Search ............ 345/810, 345/826, 779; 715/763, 765, 853, 854, 711, 715/716, 726–730, 779, 810, 826
See application file for complete search history.

(56) References Cited

U.S. PATENT DOCUMENTS

| 6,020,884 | A | * | 2/2000 | MacNaughton et al. | 345/747 |
| 6,133,915 | A | * | 10/2000 | Arcuri et al. | 345/779 |
| 6,151,634 | A | * | 11/2000 | Glaser et al. | 370/476 |
| 6,195,692 | B1 | * | 2/2001 | Hsu | 345/719 |
| 6,393,430 | B1 | * | 5/2002 | Van Ryzin | 345/733 |
| 6,434,621 | B1 | * | 8/2002 | Pezzillo et al. | 709/231 |

OTHER PUBLICATIONS

RealPlayer™ Version 6.0.3.128 © 1998.*
http://web.archive.org/web/19980703152209/www11.real.com/g2/products/player/index.html Jul. 7, 1998.*
RealNetworks, Inc. , "RealNetworks Ships Final Release of Realsystem G2, Next Generation Media Delivery System", Nov. 23, 1998.*
RealNetworks, Inc., "RealNetworks Announces Support for Microsoft Internet Explorer 5", Mar. 18, 1999.*
http://www.watch.impress.co.jp/internet/www/article911124/rpg2.htm, Nov. 24, 1998.*
http://www.watch.impress.co.jp/article/1998/11/24/real__g2.html, © 1998.*
"Blast IE 98 (Beta)—Sep. 27, 1998 ver. 1.0.47", Blast Entertainment Network. pp. 1-4. Dec. 19, 1998.*
RealNetworks, Inc., "RealNetworks Ships final release of realsystem G2, next generation media system deleivery system" Nov. 13, 1998.*
RealNetworks, Inc., "RealNetworks Announces support for MS Internet expolorer 5", Mar. 18, 1999.*

* cited by examiner

*Primary Examiner*—Cao (Kevin) Nguyen
(74) *Attorney, Agent, or Firm*—Lee & Hayes, PLLC

(57) ABSTRACT

Radio client/server architectures and graphical user interfaces for toolbars and explorer bars utilized in conjunction with Web browsers providing streaming-media content are disclosed. In one aspect of the present invention, the graphical user interface is of a Web browser with a radio toolbar that displays one or more buttons capable of controlling a source of streaming media. The graphical user interface can also include a menu bar, a standard-buttons toolbar, an address toolbar, horizontal or vertical explorer bars, a links toolbar and/or a status bar. The architecture aspect of the present invention includes a plurality of computer-executable components. One component is a radio server that plays a radio source of streaming-media. Another component is an interface for communicating with the radio server. A third component is at least one radio-client that communicates through the interface in order to provide instructions to the radio server.

21 Claims, 13 Drawing Sheets

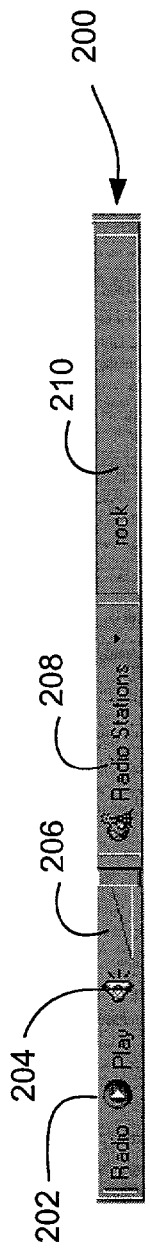
Figure 2A
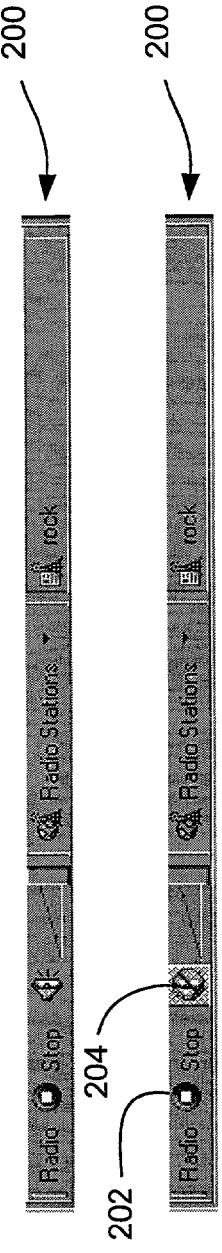
Figure 2B
Figure 2C
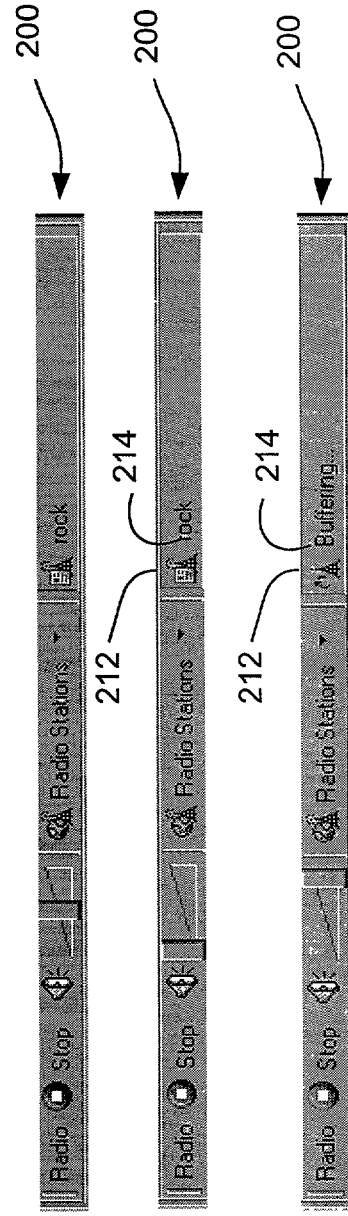
Figure 2D
Figure 2E
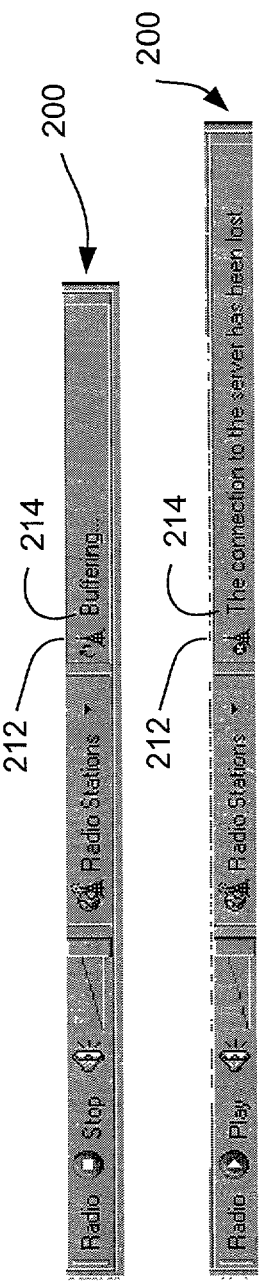
Figure 2F
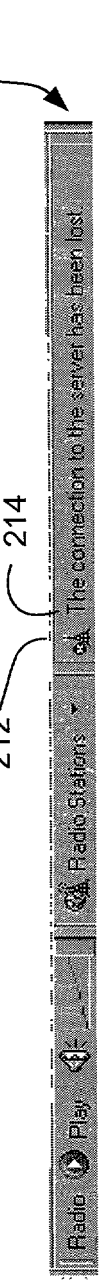
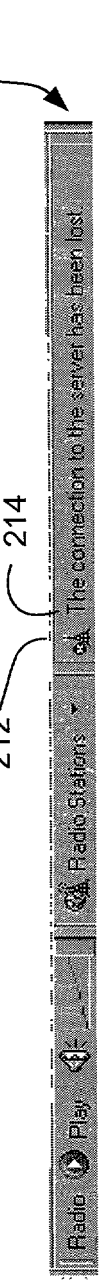
Figure 2G

WINDOWS RADIO TOOLBAR

FIELD OF THE INVENTION

The present invention relates to the field of utilizing Internet sources of streaming-media content on a computer and, in particular, to client/server architectures and graphical user interfaces for toolbars and explorer bars utilized in conjunction with Web browsers providing streaming-media content.

BACKGROUND OF THE INVENTION

In recent years, there has been a tremendous proliferation of computers connected to a global network known as the Internet. A "client" computer connected to the Internet can download digital information from "server" computers connected to the Internet. Client application and operating system software executing on client computers typically accepts commands from a user and obtains data and services by sending requests to server applications running on server computers connected to the Internet. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and other protocols.

The HTTP protocol is used to access data on the World Wide Web, often referred to as "the Web." The World Wide Web is an information service on the Internet providing documents and links between documents. The World Wide Web is made up of numerous Web sites around the world that maintain and distribute Web documents. A Web site may use one or more Web server computers that are able to store and distribute documents in one of a number of formats including the Hyper Text Markup Language (HTML). An HTML document can contain text, graphics, audio clips, and video clips, as well as metadata or commands providing formatting information. HTML documents also include embedded links, such as URLs, that reference other data or Web pages located on the local computer or network server computers. "URL" is an abbreviation for "uniform resource locator," the global address of documents and other resources on the World Wide Web.

A Web browser is a client application, software component, or operating system utility that communicates with server computers via FTP, HTTP, and Gopher protocols. Web browsers receive Web documents (i.e. Web pages) from the network and present them to a user. Internet Explorer, available from Microsoft Corporation, of Redmond, Wash., is an example of a popular Web browser.

Recently, many users have started utilizing their Web browsers to locate streaming media sources. After a streaming media source is located, the Web browser works in conjunction with a media player in order to play the media on the client computer's monitor and/or speakers. An example of a popular media player is Windows Media Player, also available from Microsoft Corporation. A streaming media source is a source (e.g., a URL) that "streams" media/data to a client computer. Streaming is a technique for transferring data such that it can be processed as a steady and continuous stream. Streaming technologies are becoming increasingly important with the growth of the Internet because most users do not have fast enough access to download large multimedia files quickly. With streaming, the Web browser or media player can start displaying the data before the entire file has been transmitted. An example of a streaming media source is a radio station that "streams" its broadcast to users on the Internet. In this example, the streaming-media source (i.e. radio station) is downloaded from the Internet and played on a client computer using the Windows Media Player.

Unfortunately, it is inefficient and cumbersome for users to use two separate applications (e.g. Web browsers and media players) in order to browse and listen to streaming-media sources. For example, if a user is listening to a radio broadcast with a media-player application and decides to search for a new radio station, the user must launch a separate application (i.e. a Web browser) in order to find the radio station. Moreover, access to media-player and browser controls requires manual switching between the two applications by the user. This significantly hinders the Web browsing experience. This is illustrated in FIG. 13.

Further, Internet radio broadcasts typically contain information relevant to the item being played that is displayed in most media-players as text and images (e.g. information regarding the singer, record company, copyright, etc.). Many users are interested in viewing this information whenever the item changes. In order to simultaneously view this information and browse the Internet, the media-player and Web browser application windows must be displayed side-by-side on the user's screen. This significantly reduces the amount of available viewing area for displaying Web pages in a Web browser.

Furthermore, selecting a URL for an Internet radio station on a Web page automatically launches a media-player application. This is slow and results in a very distracting and unpleasant user experience.

Another prior-art integration of radio players with Web browsers has been to embed the player control in a Web page. The obvious limitation to this approach is that the radio station is dependent on the Web page that is hosting it. The user has no way of changing to a new Web page without interrupting reception of the radio station broadcast.

Accordingly, an object of the present invention is to provide a single application that allows a user to play, control and select streaming-media sources, while simultaneously browsing the Internet.

A further object of the present invention is to provide seamless integration of a radio player with a Web browser so that a radio station can be played without interruption irrespective of the content being browsed.

SUMMARY OF THE INVENTION

The present invention is stored as computer-executable instructions on a computer-readable medium. One aspect of the present invention is a computer system that has at least one speaker for playing a first source of streaming media and has a display device for rendering a graphical user interface of a Web browser displaying a Web page in a browser pane. The graphical user interface includes a radio toolbar for displaying at least one button capable of controlling the first source of streaming media. The radio-toolbar buttons can include: a play button for instructing the Web browser to play the first source of streaming media, a mute button for instructing the Web browser to silence the first source of streaming media, and a volume slider for controlling the volume of the first source of streaming media played over the speaker. The radio toolbar buttons can also include: a radio-stations button allowing user selection of the first source of streaming media, and an information area displaying information about the first source of streaming media. Additionally, the graphical user interface can also include a menu bar, a standard-buttons toolbar, an address toolbar, horizontal or vertical explorer bars, a links toolbar and a status bar.

Another aspect of this invention is the architecture of the radio client and server(s). This aspect encompasses a computer-readable medium having computer-executable components. One component is a radio server component that plays a radio source of streaming-media. Another component is an interfacing component for communicating with the radio server component. A third component is at least one radio-client component that communicates through the interfacing component in order to provide instructions to the radio-server component regarding the radio source of streaming media. Exemplary interfacing components include shared memory and Windows messaging components.

BRIEF DESCRIPTION OF THE DRAWINGS

The present invention may take physical form in certain parts and steps, preferred embodiments of which will be described in detail in this specification and illustrated in the accompanying drawings which form a part hereof, wherein:

FIGS. 2A-G illustrate a radio toolbar in accordance with the present invention;

DETAILED DESCRIPTION OF THE INVENTION

The present invention provides client/server architectures as well as graphical user interfaces for toolbars and explorer bars utilized in conjunction with Web browsers furnishing streaming-media content. The toolbar user-interface element of the present invention solves the usability problems of the prior art by providing a seamless integration into existing Web-browser tool bars. The integration issues are further resolved by employing a client/server approach where a radio server object maintains all the functionality to connect and stream the radio on the computer 20. Each Web-browser-integrated radio client (i.e. radio toolbar) registers with the server on creation and becomes a client of the radio server. The lightweight radio client only contains functionality to display the graphical user interface needed to play, control and select streaming-media content.

In particular, radio toolbar design and client/server architecture of the present invention solves the usability problems of the prior art as follows. First, a radio station guide is available as a menu option on the radio toolbar. When selected, this menu option takes the user to a radio-station Web page that hosts a compilation of Internet radio stations, streaming-media content, and/or a media search engine. Second, several radio controls like Play, Stop, Volume and Mute are available in close proximity to the regular Web browser controls. The close proximity of the radio controls to the Web browser controls provides a simple, easy-to-use user interface. Third, the information pane of the radio toolbar provides the user with meta information being transmitted as part of a radio broadcast. Thus, the user can keep the Web browser application maximized (or full screen) while viewing this information. Fourth, activating a radio link displayed on a Web page causes the radio server and client to switch to the new station without the distraction of a separate application launch. Users can thus navigate the browser to a different location without affecting the user's reception of the radio-station broadcast.

The client/server architecture further resolves the integration issues in the following manner. The radio server broadcasts an update message to all instances of the player, which allows for all radio clients to synchronize their user interface so that they each display the same play state and station information. Playing a new radio station in any instance of the Web browser automatically switches off the old station and starts the new one since all station connectivity and playback occurs on the radio server. Further, having lightweight radio clients without user interface implementation decreases the memory foot print and load time for any Web browser instance. These and other aspects of the present invention are described in detail below.

Figure 1:
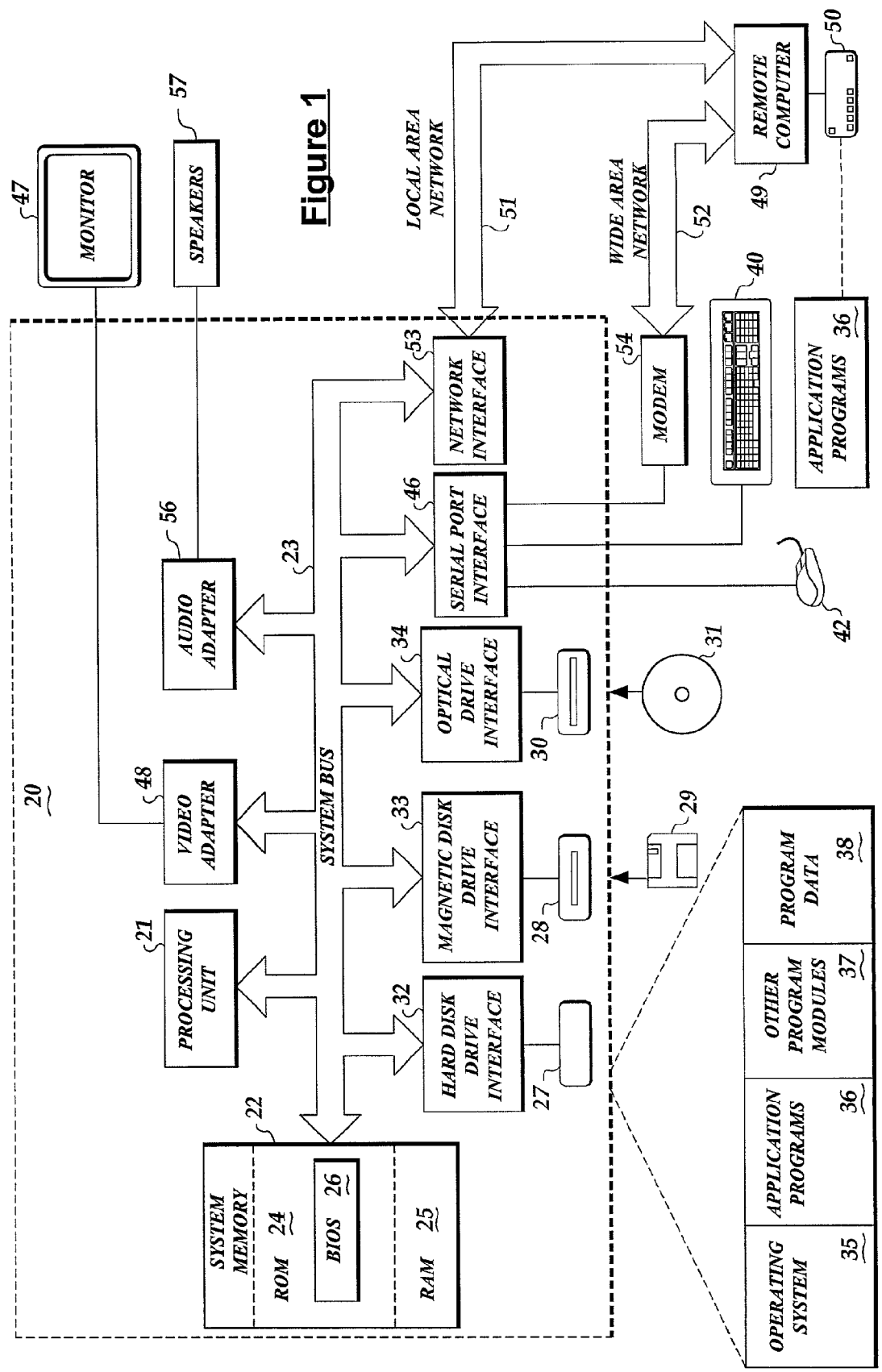
FIG. 1 is a block diagram of a general-purpose computer system for implementing the present invention.
Figure 3:
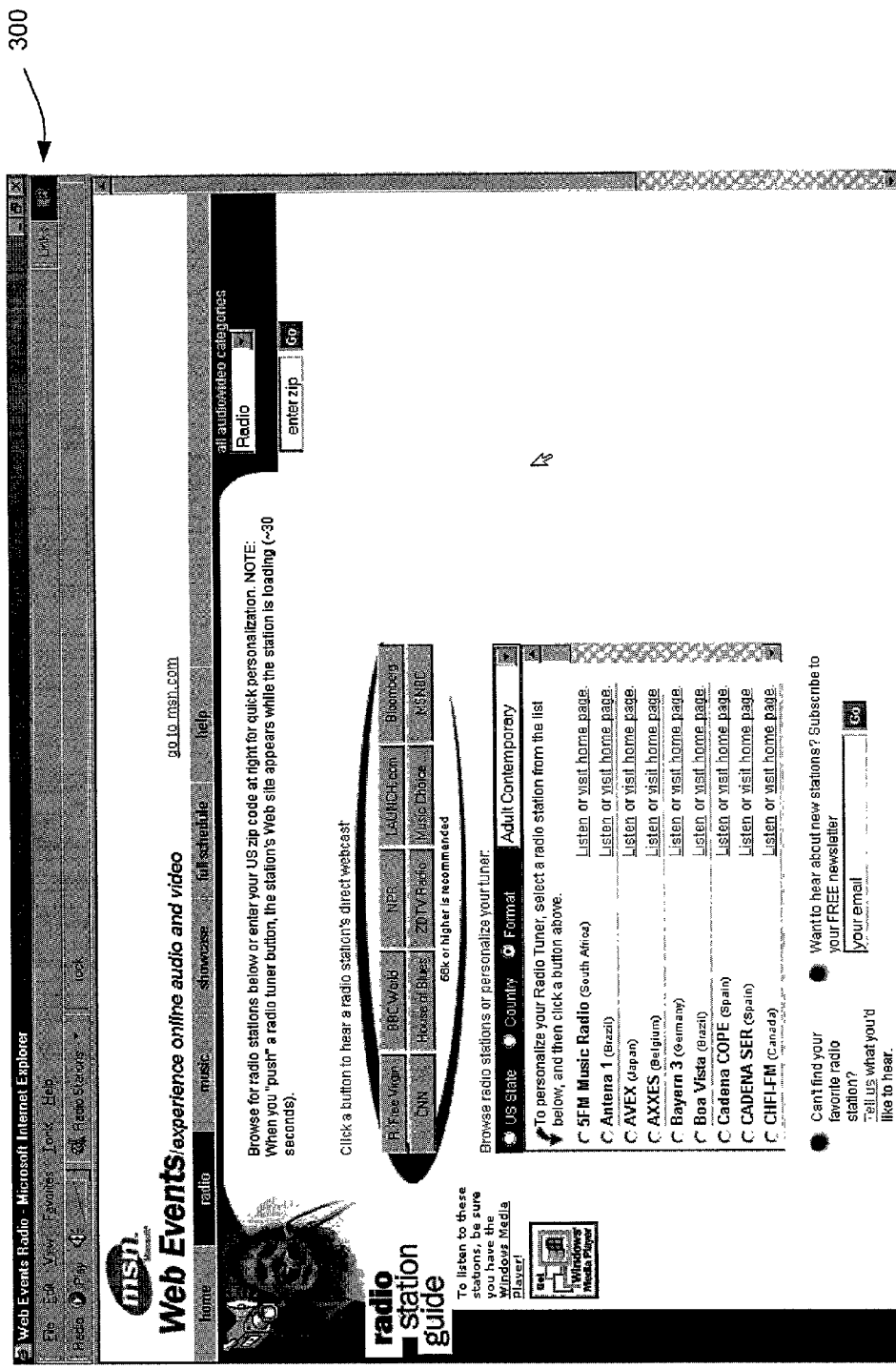
FIG. 3 illustrates a Web browser displaying a Web page, wherein the Web browser includes the radio toolbar of FIGS. 2A-E as well as a menu bar.
Figure 4:
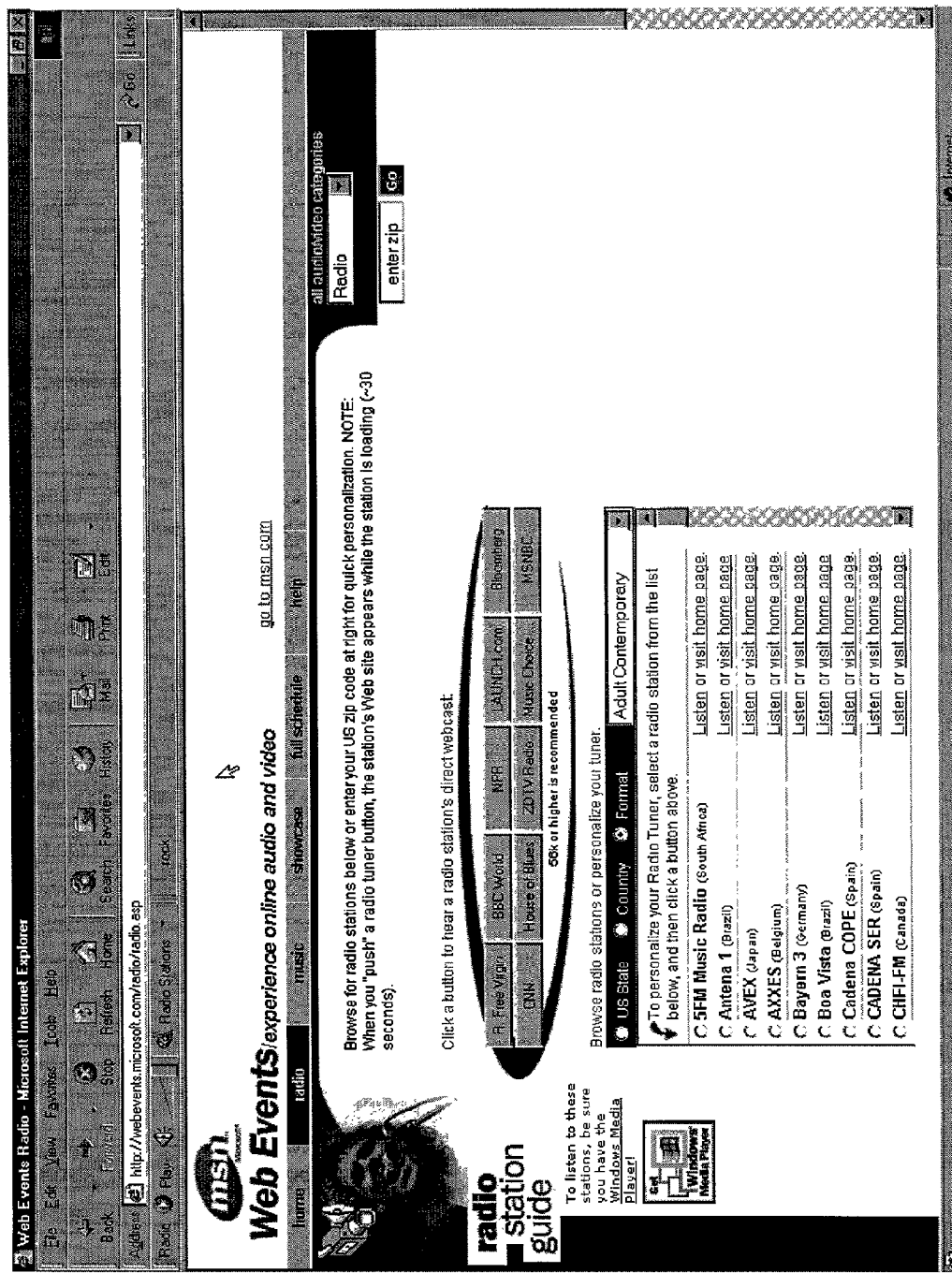
FIG. 4 shows the Web browser of FIG. 3, wherein the Web browser also includes a standard-buttons toolbar, an address toolbar, a links toolbar and a status bar.

In accordance with the present invention, a Web browser executes on a computer, such as a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computer 49. Each remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet. As depicted in FIG. 1, the remote computer 49 communicates with the personal computer 20 via the local area network 51. The remote computer 49 also communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

With reference to FIGS. 2A-E and 3-5, the radio client of the present invention is a radio toolbar 200 inside a Web browser 300, preferably Internet Explorer. The radio toolbar 200 is composed of the following components: a play/stop button 202, a mute button 204, a volume slider 206, a radio-stations button 208, and an information area 210.

The play/stop button 202 is a toggle button that communicates to the user when the radio is on or off. When streaming-media content is not currently being played, then the play button 202 is displayed. The play button, shown in FIG. 2A, has three states: enabled, disabled and highlighted. If no content is loaded in the radio, the play/stop button is "disabled." Preferably, the disabled state is a flat gray, play button. This state should only occur if no content has been played by the radio. Once content has been played, the last station is loaded; therefore, this button 202 is enabled. Similarly, if the user loads a station, the button 202 is "enabled." Clicking the button 202 executes the playing of the radio station or other streaming-media source and toggles the button 202 from "play" to "stop." Preferably, if the user positions a cursor over the button 202 while content is not being played, the button 202 should be highlighted and the tip of the cursor will display "play" as its rollover tool tip.

Once the user has begun playing the radio, the play/stop button 202 changes to "stop." This is shown in FIGS. 2B-E and 5. Clicking the button 202 while in this state stops the radio station and toggles the state of the button 202 to "play." Preferably, if the user positions a cursor over the button 202 while content is being played, the button 202 should be highlighted and the tip of the cursor will display "stop" as its rollover tool tip.

The volume controls for the radio toolbar include two elements: the mute button 204 and the volume slider 206. Preferably, the mute button 204 has four states: inactive, active, active rollover and muted (depressed). If the user does not have a sound card installed or a program (e.g. DirectShow) cannot modify the volume, the mute button 204 is disabled. Otherwise, the mute button 204 is enabled regardless of the content being played. With respect to the active rollover state, the mute button 204 is preferably highlighted and a "mute" rollover tool tip is displayed whenever the user positions the cursor over the button 204. When the user clicks on the mute button 204, the button 204 preferably appears depressed in order to indicate that the volume is muted. FIG. 2C illustrates the mute button 204 when depressed, and FIGS. 2A-B and 2D-E illustrate the mute button 204 when not depressed.

With respect to the other volume control, the volume slider 206 preferably has two states: inactive and active. If the user does not have a sound card installed or if the computer 20 cannot modify the volume, the slider 206 is disabled. Otherwise, the volume slider 206 is always active irrespective of whether there is a radio station playing. This allows the user to adjust the volume before starting to listen to content, as well as when the volume is muted. The volume slider is straightforward. Sliding the slider 206 to the left decreases the volume. And, sliding the slider 206 to the right increases the volume. The volume slider 206 only adjusts the volume of the streaming-media source (e.g. the radio station broadcast). Clicking to either side of the volume slider 206 causes the handle to move to the exact spot the user selected. Preferably, the click region is the width of the triangle on the volume slider 206 and the vertical extent of the handle. It is also preferred that when the user exits the Web browser 300 or turns off the radio, the volume setting chosen by the user is maintained. Thus, the next time the user starts the radio client, the volume will be at the same setting. Of course, it is preferred that the user positions a cursor over the volume slider 206 while content is being played, the tip of the cursor will display "volume control" as its rollover tool tip.

Figure 5:
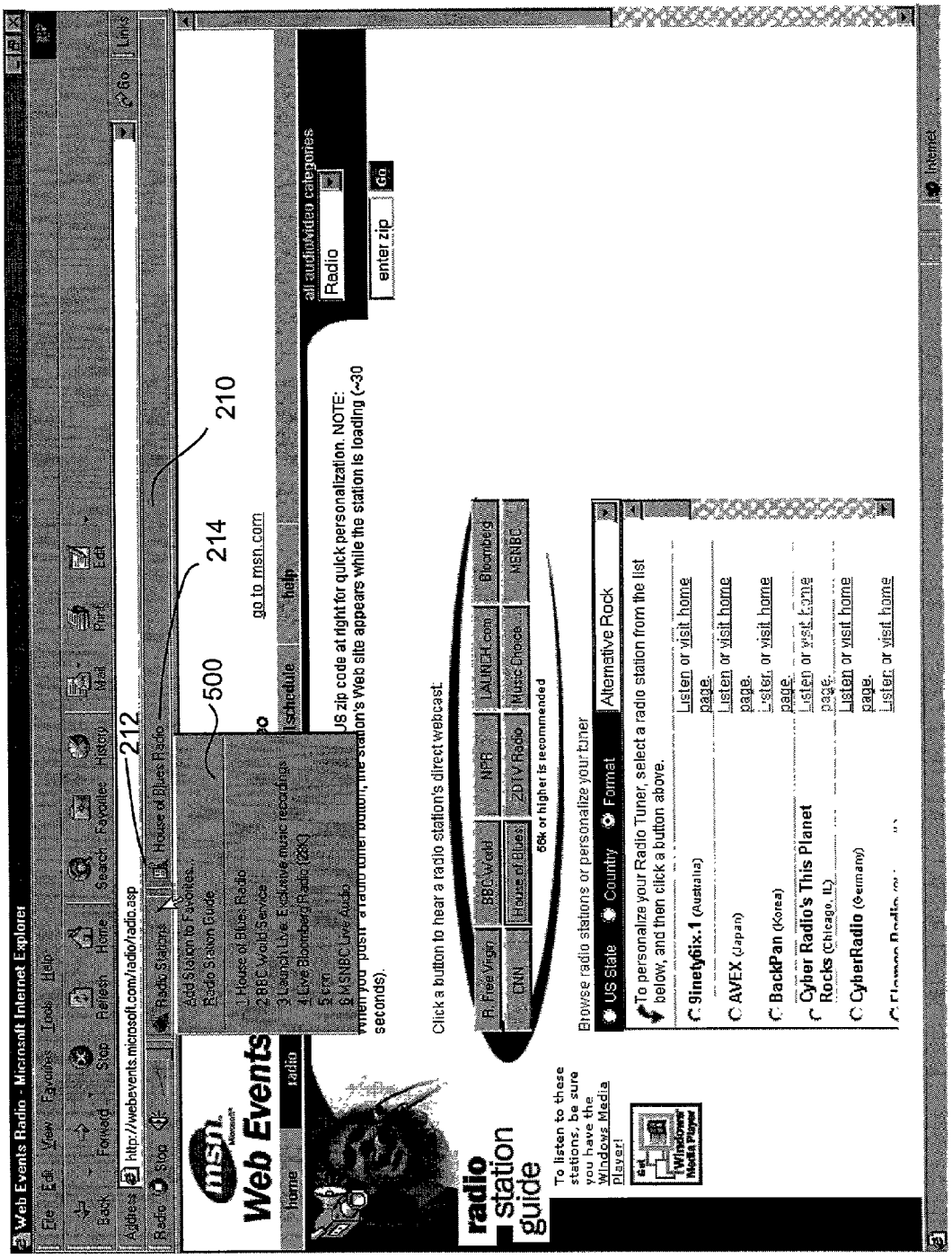
FIG. 5 depicts the Web page of FIG. 4 after a user has selected the "Radio Stations" button on the radio toolbar.

The radio-stations button 208 is a menu drop-down button adjacent to the volume slider 206. The radio-stations button 208 provides the user quick access to playing and selecting streaming-media content (e.g. radio stations) as well as allows the user to add a streaming-media source to the user's favorites folder. The radio-stations button 208 is preferably always active. The radio-stations button 208 also has an active-rollover state. In this state, the button 208 is preferably highlighted and a "radio station" rollover tool tip is displayed whenever the user positions the cursor over the button 208. The radio-stations button 208, when depressed, is shown in FIG. 5.

When the radio-stations button 208 is selected, a drop-down list 500 is displayed. The list 500 includes an "add station to favorites" entry, the "radio station guide" and the six most recently used radio stations. The "add station to favorites" option launches the Web browser's 300 "add to favorites" dialog box. This allows the user to add the currently playing stream to their favorites folder. The radio station guide is an online Web page that directs users to locate radio content. The preferred radio station guide can be found at http://webevents.microsoft.com/radio/radio.asp. The six most recently used radio stations are the last six successfully opened stations. If the user successfully connects to a seventh station, the least recently used station is removed from the list and the seventh becomes one of the new stations in the drop-down list. Selecting one of the six most recently used stations causes the selected station to be loaded in the radio toolbar. This makes the station the most recently used and therefore the last station to be removed from the drop-down list 500.

The information area 210 is adjacent the radio-stations button 208 and consists of two components: the status text 214 and the status icon 212. The status text 214 presents the user with the meta data information associated with the radio station or other streaming-media source, as well as communicates the status of the Internet connection to the source. Once a connection to a streaming-media source is established, the status text 214 displays the meta data once. Information is displayed in the following order: show, clip, author and copyright. There is a two-second delay between showing each individual string. Once the entire detail has been displayed, the status text 214 stops on the radio station name. To review the meta data, the user simply needs to position the cursor into the information area 210. This will cause the meta data information to be redisplayed. If no ASX file is loaded, or the content contains no meta data, then the text 214 displayed in the area 210 reads "There is no additional information for this station." If there is an HREF associated with the ASX data, moving the cursor over the text 214 causes the data to be underlined, thus identifying a hyperlink. Clicking on the hyperlink launches a new instance of the Web browser 300 and navigates to the specified Web page. If no file has been loaded, then the status text 214 in the information area 210 is blank. Occasionally, an error can occur when a Web browser 300 is attempting to connect to a streaming-media source. When an error occurs, the error is passed to the radio toolbar and is displayed as status text 214 in the information area 210. An example is shown in FIG. 2G.

With respect to the status icon 212, the icon 212 represents to the user the status of the Internet connection to the streaming-media source. If the user is connected to a streaming source that is currently playing on the computer 20, the displayed icon is the meta default icon. This is shown as icon 212 in FIGS. 2B-E and 5. If the user is not connected to a streaming source or if the source is stopped (i.e. not playing), then no icon is displayed as illustrated by FIG. 2A. Persons of skill in the art will understand that a computer goes through a number of states when attempting to connect to a streaming-media source, namely: buffering, opening and connecting. The status icon 212 represents the state of this with its progressing circle. As buffering continues, the circle builds from no circle at all to a complete circle. Once the circle has been completed, the process repeats itself until a connection is made or an error occurs. The functionality of the status icon 212 can also be incorporated into the icon 400 for the status bar 402 in the Web browser 300.

Figure 6:
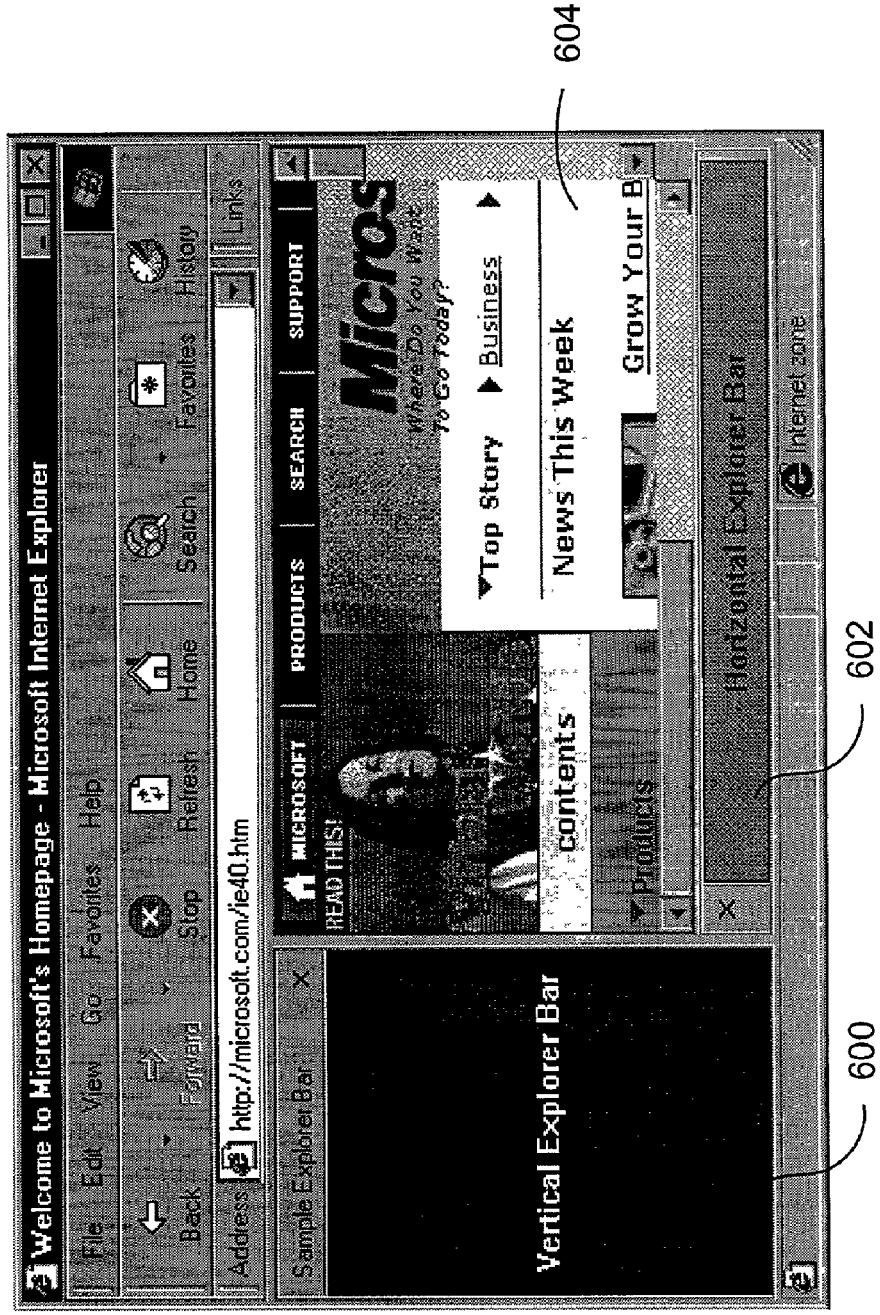
FIG. 6 illustrates a Web browser with vertical and horizontal explorer bars as well as a radio toolbar, a menu bar, a standard-buttons toolbar, an address toolbar, a links toolbar and a status bar.
Figure 7:
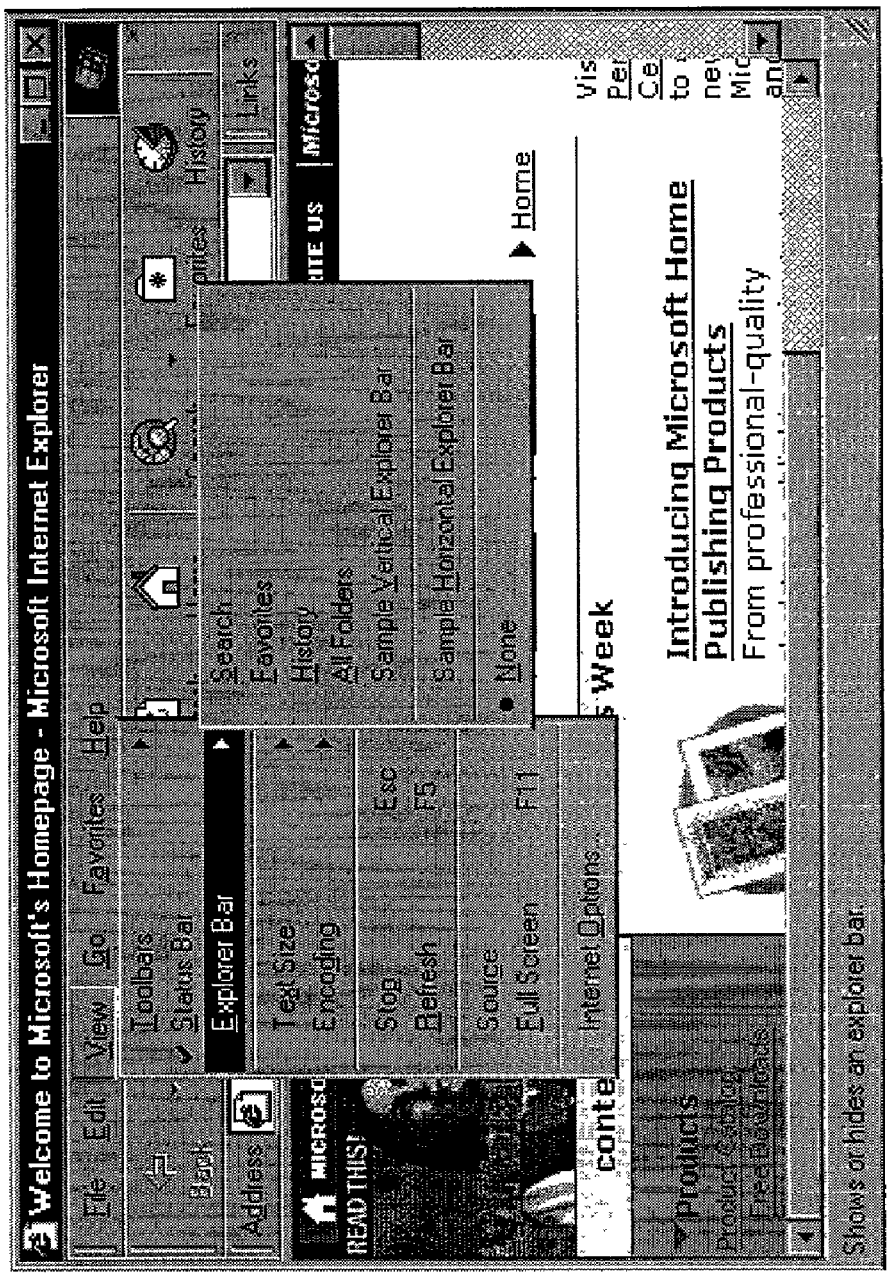
FIG. 7 illustrates how users can selectively choose between vertical and horizontal explorer bars from a Web browser menu bar.

Alternatively, the features, buttons and controls of the radio toolbar 200 could be incorporated as a Web browser extension such as an explorer bar, either vertical 600 or horizontal 602, as illustrated in FIGS. 6 and 7. Browser extensions allow developers to provide easy access to their browser enhancements by adding elements (like an explorer bar also known as browser bands and communication bands) to the default user interface. This feature enables developers to create explorer bars and add entries into the standard context menus as well as add entries to the Tools menu and buttons to the toolbars in the Microsoft® Internet Explorer Web browser.

Explorer bars 600, 602 provide a display area adjacent to the browser pane 604. It is basically a child window within the Web browser 300, and it can be used to display information and interact with the user in much the same way. Explorer bars are most commonly displayed as a vertical pane 600 on the left-hand side of the browser pane 604. However, an explorer bar can also be displayed horizontally 602, below the browser pane 604.

Figure 8:
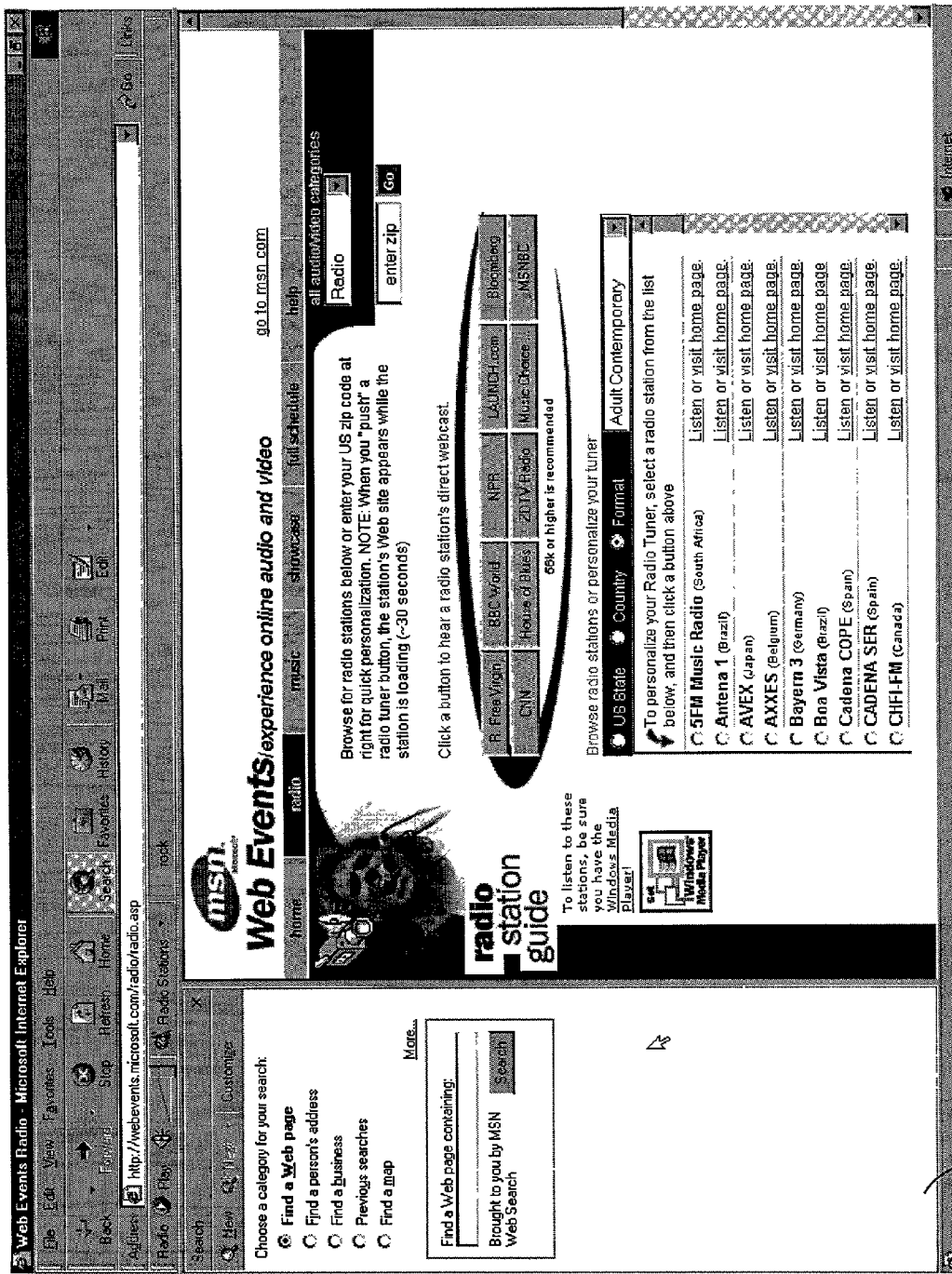
FIG. 8 shows the Web browser of FIG. 4, wherein the Web browser includes a menu bar, a standard-buttons toolbar, an address toolbar, a radio toolbar, a vertical explorer bar, a links toolbar and a status bar.

There is a wide range of possible uses for the explorer bar 600, 602. As shown in FIG. 7, users can select which option they wish to see in several different ways, including selecting it from the explorer bars submenu of the View menu, or clicking a toolbar button. Internet Explorer provides several standard explorer bars, including favorites and search. The search explorer bar 800 is shown in FIG. 8. One possible use for the explorer bar 600, 602 is provide a text box for input of a search query in order to identify one or more radio stations or other streaming-media sources. Another possible use is to provide a list box for allowing user selection from a list of radio stations or streaming-media formats such as: alternative, classical, country, international, jazz, local news, pop, rock, sports and talk. Still another possible use is to provide one or more hyperlinks that advertise other URLs, Web pages, products, services, etc.

Figure 9:
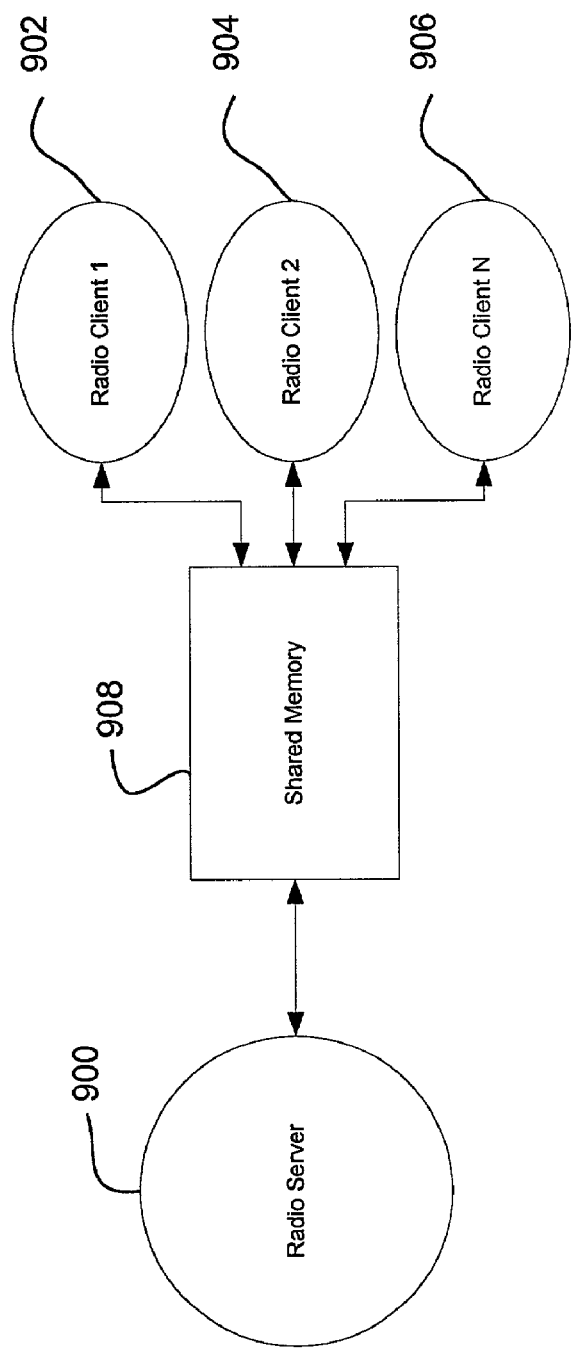
FIG. 9 shows a block diagram of one embodiment of the radio client/server architecture of the present invention, wherein the client and server communicate through a shared memory.
Figure 10:
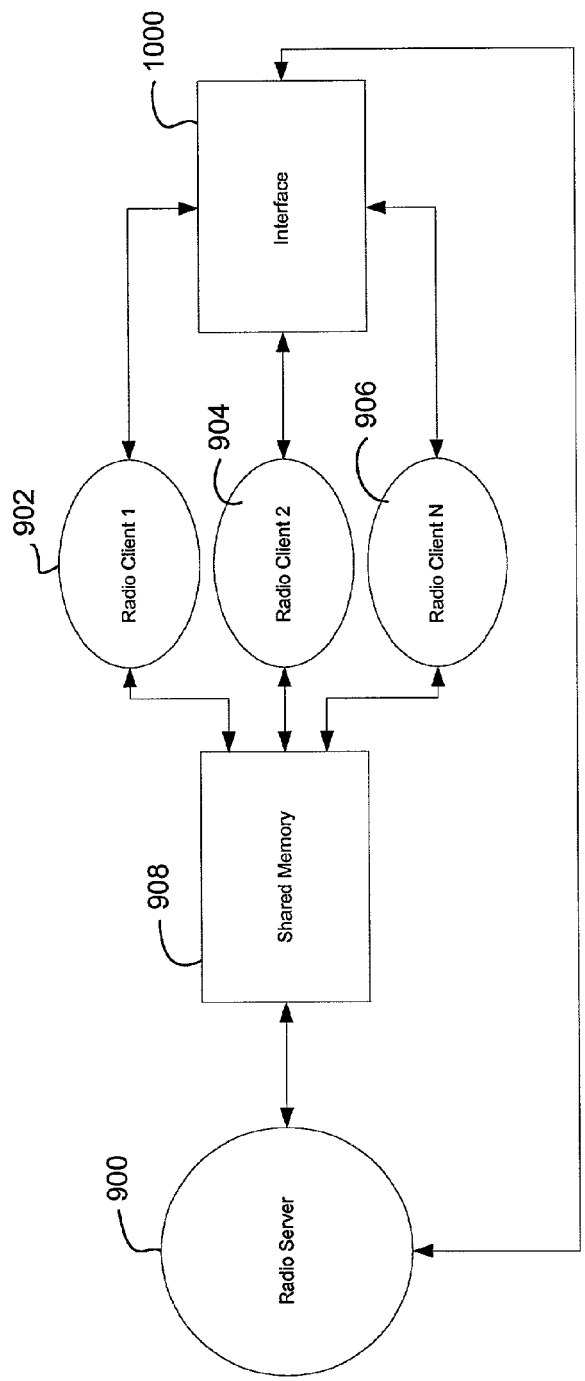
FIG. 10 illustrates a block diagram of another embodiment of the radio client/server architecture of the present invention, wherein the client and server communicate through a shared memory and/or an interface.
Figure 11:
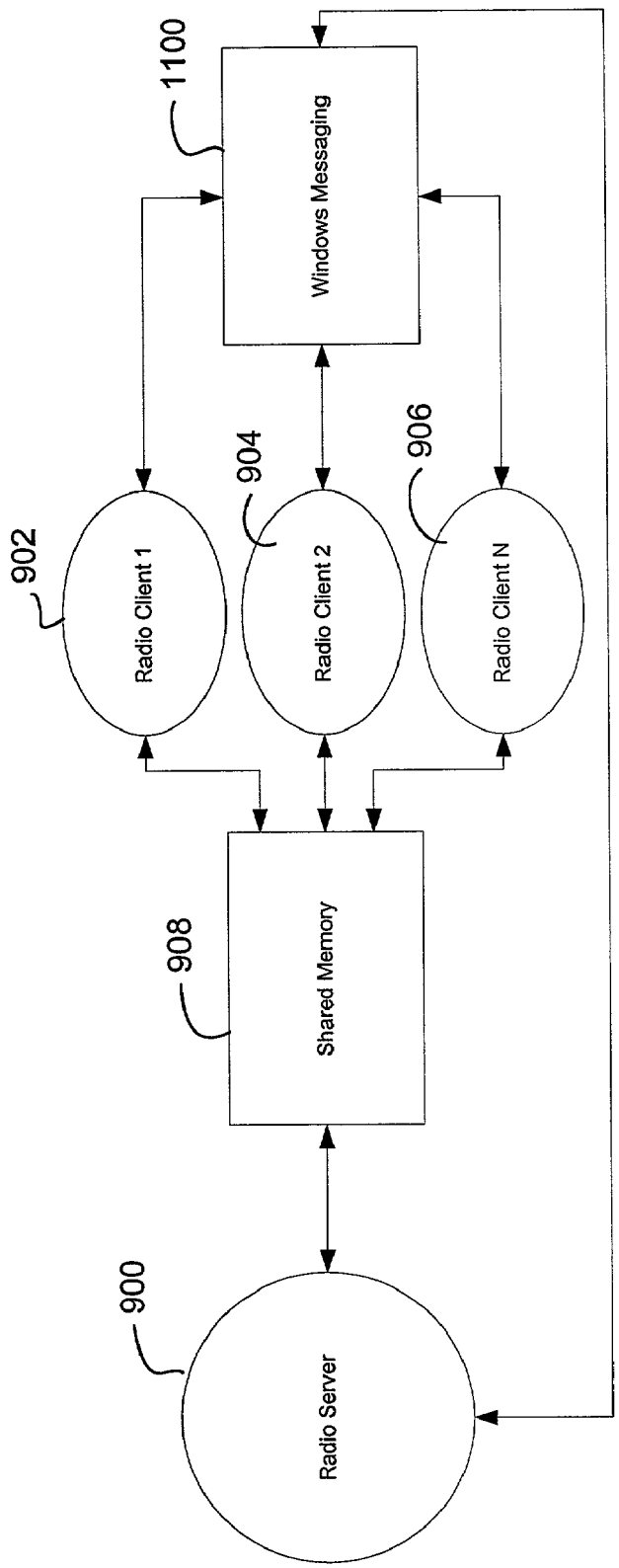
FIG. 11 is a block diagram of still another embodiment of the radio client/server architecture of the present invention, wherein the client and server communicate through a shared memory and/or through Windows messaging.
Figure 12:
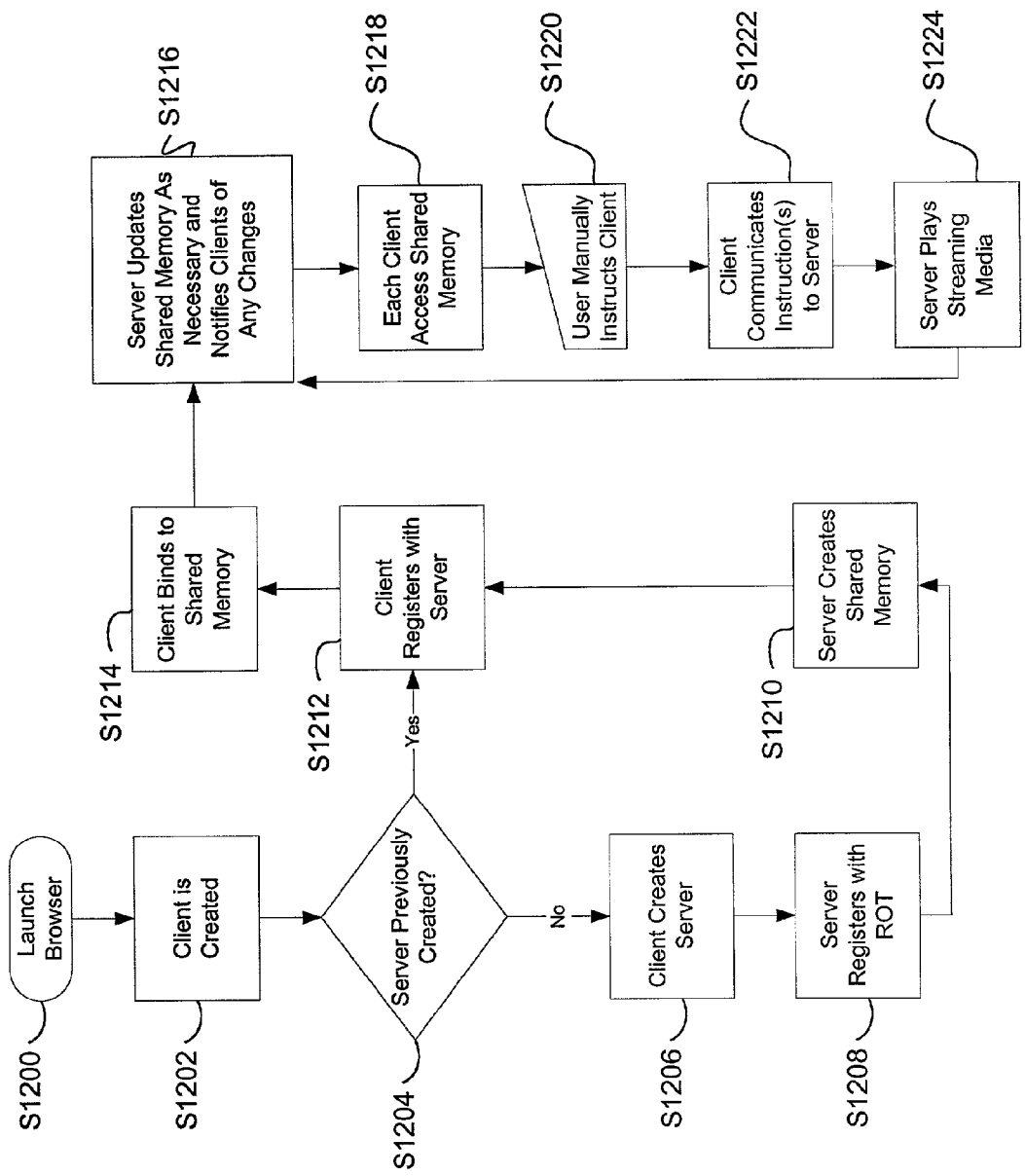
FIG. 12 is a flow diagram illustrating the various steps performed by the client and server in the present invention.
Figure 13:
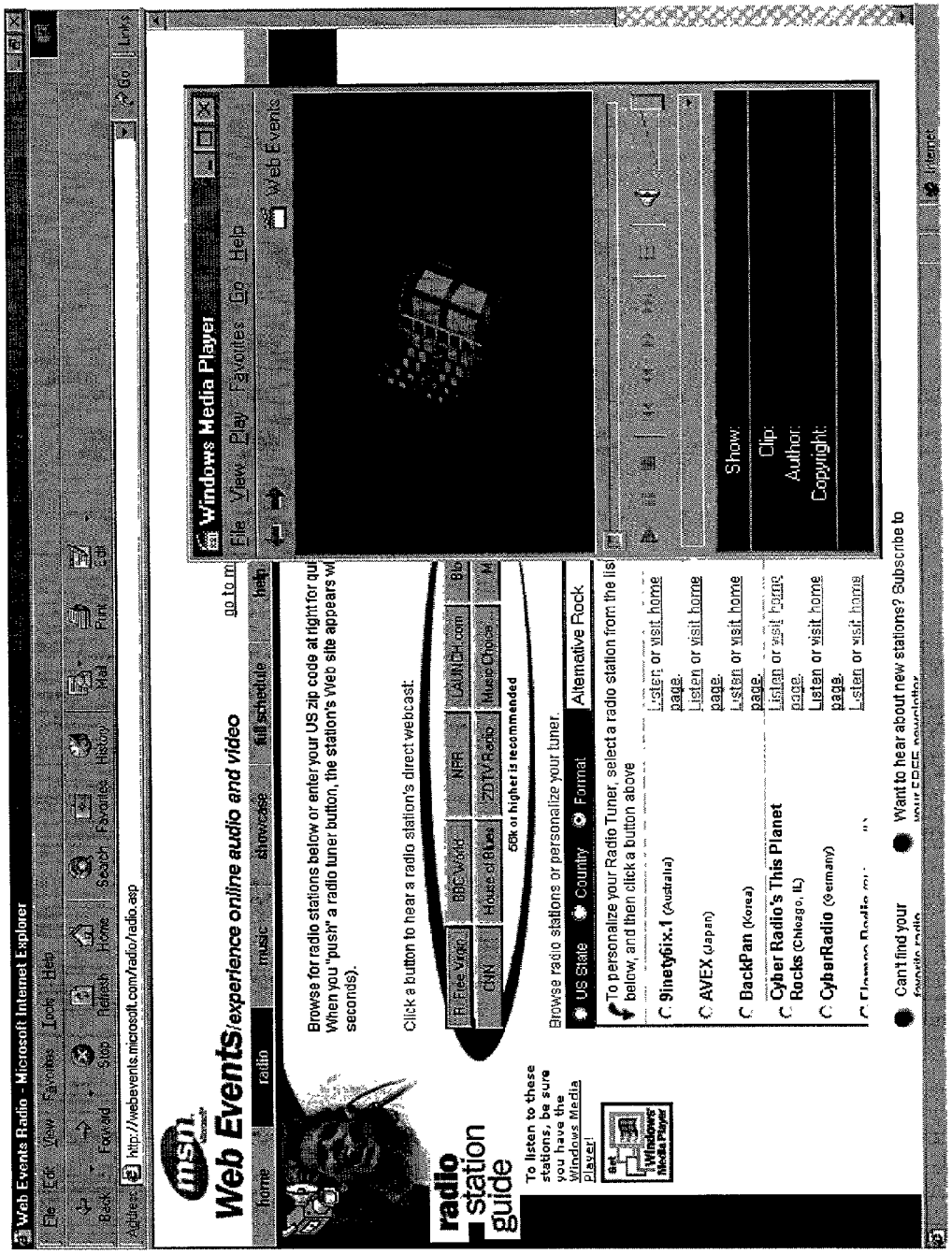
FIG. 13 depicts the Windows Media Player and Web browser combination used in the prior art.

A few of the various topologies for the client/server architecture of the present invention are set forth in FIGS. 9-11. In general, the architecture includes a radio server 900 and one or more radio clients 902, 904, and 906. The radio server 900 maintains all of the functionality to connect and stream the streaming-media source (e.g. radio) on the computer 20. Each Web-browser-integrated radio client (i.e. radio toolbar) registers with the server 900 on creation and becomes a client 902, 904, 906 of the radio server. The lightweight radio client 902, 904, 906 only contains functionality to display the graphical user interface needed to play, control and select streaming-media content.

The radio server 900 can communicate with the radio client(s) 902, 904, 906 in any number of ways, including: through a shared memory 908, through an interface 1000, and/or by virtue of the Windows messaging system 1100. The shared memory 908 could be located on any computer-readable medium on the computer 20 including, but not limited to: RAM 25, a hard drive 27, a magnetic disk 28 and/or an optical disk 31.

Preferably, the radio server 900 broadcasts a message to all instances of the radio client 902, 904, 906 whenever an update is necessary. This allows all radio clients 902, 904, 906 to synchronize their user interface so that they each display the same play state and station information. Playing a new radio station in any instance of the Web browser 300 automatically switches off the old station and starts the new one since all station connectivity and playback occurs on the radio server 900. Further, having lightweight radio clients 902, 904, 906 without user interface implementation decreases the memory foot print and load time for any Web browser instance.

More particularly, the radio client(s) 902, 904, 906 and server 900 interact as follows. Whenever an instance of a Web browser 300 is launched S1200, a radio client is created S1202. The newly created client 902, 904, 906 accesses the system ROT (running object table) in order to determine if the server 900 is already running S1204. If the server 900 was not previously created, then the radio client creates an instance of the server S1206. The first instantiated radio client preferably creates the radio server 900 as a multi-threaded object in the same process as the Windows shell. The server 900 creates a new thread for its helper objects on which the server relies for its system needs such as connecting to the network and playing the streaming media. The new thread is created for stability reasons. The server 900 then proceeds to use the ROT to register itself S1208.

After registering with the ROT, the server 900 preferably establishes a shared memory 908 in RAM 25, S1210. The shared memory 908 maintains the current playback-state of the server 900 as well as end-user stream information. As previously mentioned, this information is available for examination by all clients 902, 904, 906. This is performed in order to avoid expensive inter-process communication between the server 900 and each client 902, 904, 906 whenever this information changes.

If, in S1204, the server 900 was previously created, then the client 902, 904, 906 registers itself with the server 900, S1212. Preferably, the client 902, 904, 906 uses a private interface 1000 to directly register with the server 900; however, any means of communication and registration could be used. The radio client 902, 904, 906 then proceeds to bind itself to and access the shared memory 908, S1214.

Under normal client/server operation, the server 900 will update the shared memory 908 whenever the current playback-state or end-user stream information has been changed S1216. As previously mentioned, the server 900 send an update message to each client 902, 904, 906 whenever this occurs. The clients 902, 904, 906 will then access the shared memory in order to obtain the current information S1218.

Whenever a user selects a radio station S1220, for example, by selecting a one of the most recently used stations on the drop-down list 500 for the radio stations button 208, then the radio client 900, 902, 904 receives the URL to the radio station. The radio client 902, 904, 906 then uses the cached server interface 1000 to ask the server 900 to stream and play the particular station S1222. The server proceeds to play the radio station S1224. Further, whenever the user provides an instruction to one of the clients 902, 904, 906, such as Play, Stop, Mute, Change Volume, etc., the client 902, 904, 906 provides this instruction to the server 900.

The above-outlined process continues until the client is shut down. When a radio client 902, 904, 906 is switched off (explicitly or as a result of the Web browser instance shut down), the client unregisters itself with the server 900 using the cached server interface 1000 or the Windows messaging system 1100. On client unregistration, the server 900 removes the particular client from its client list and no longer posts update messages to it. The client 902, 904, 906 proceeds to unbind itself from the shared memory 908.

After the last radio client 902, 904, 906 is closed (e.g. by switching off the radio toolbar or by shutting down the Web browser instance), the radio playback is stopped (if playing). Preferably, the radio server 900 is maintained for a period of time, such as five minutes, in the anticipation that another radio client might be initiated shortly. After the period of time elapses, the server 900 unregisters itself from the system ROT, releases the shared memory 908 as well as all system resources and helper objects. Lastly, the server 900 terminates its thread.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A computer system having a display device for rendering a graphical user interface of a Web browser displaying Web page content in a browser pane, and having at least one speaker for playing streaming media, the graphical user interface of the Web browser comprising:

a) a radio toolbar displaying radio-toolbar buttons for controlling the streaming media irrespective of the Web page content being browsed, the radio-toolbar buttons including:

i) a play/stop button enabled to toggle between play and stop to control, respectively, playing and stopping of available streaming media, and disabled when streaming media is unavailable;

ii) a mute button for instructing the Web browser to silence streaming media, the mute button assuming an inactive state if the computer system cannot modify volume and an active state otherwise;

iii) a volume slider for controlling the volume of streaming media played over the speaker, the volume slider assuming an inactive state if the computer system cannot modify volume and an active state otherwise;

iv) a radio-stations button selectable to alter a source of streaming media by providing a drop-down list that includes an "add station to favorites" entry and a list of recently used radio stations; and v) an information area displaying a status text component and a status icon component, the status text component presenting meta data information associated with a streaming media source, the status icon component presenting an Internet connection status regarding the streaming media source; and b) a cursor controllable by a user to select the radio-toolbar buttons, the cursor configured to highlight a radio-toolbar button while passing over that radio-toolbar button and to display a rollover tool tip describing a corresponding function of the highlighted radio-toolbar button; and c) the radio toolbar and the cursor configured to control the graphical user interface of the Web browser via access to a shared memory established on the computer system, wherein the shared memory is shared between a radio client and a radio server to maintain a current playback-state of the radio server.

2. A computer system as recited in claim 1, wherein the rollover tool tip for the play/stop button is "play" when the play/stop button is toggled to stop, and "stop" when the play/stop button is toggled to play.

3. A computer system as recited in claim 1, wherein the rollover tool tip for the mute button is "mute" when the mute button is active.

4. A computer system as recited in claim 1, wherein the rollover tool tip for the volume slider is "volume control" when the volume slider is active.

5. A computer system as recited in claim 1, wherein the rollover tool tip for the radio-stations button is "radio station" when the radio-stations button is active.

6. A computer system as recited in claim 1, wherein the graphical user interface further comprises an "add to favorites" dialog box initiated by a selection of the "add station to favorites" entry from the drop-down list of the radio-stations button, the "add to favorites" dialog box allowing a user to add a currently playing streaming media source to a favorites folder.

7. A computer system as recited in claim 1, wherein the status icon component presenting the Internet connection status comprises:
a default icon of a streaming media source if the streaming media source is currently playing;
a progressing circle while streaming media content is buffering; and
a blank space if there is no connection to a streaming media source.

8. A computer system as recited in claim 1, wherein the radio-toolbar buttons are adjacent to one another on the radio toolbar as follows:
the mute button being adjacent to the play/stop button;
the volume slider being adjacent to the mute button;
the radio-stations button being adjacent to the volume slider; and
the information area being adjacent to the radio-stations button.

9. A computer system as recited in claim 1, wherein the graphical user interface further comprises at least one explorer bar for providing a display area adjacent to the browser pane, the at least one explorer bar capable of displaying information and allowing user interaction.

10. A computer system as recited in claim 1, wherein the graphical user interface further comprises a menu bar for allowing user control of the Web browser and the Web page, the menu bar including a plurality of menu entries selected from the group comprising:
File;
Edit;
View;
Favorites;
Tools; and
Help.

11. A computer system as recited in claim 1, wherein the graphical user interface further comprises a navigation toolbar that allows user navigation of the Web page, the navigation toolbar including a plurality of navigation-toolbar buttons selected from the group comprising:
Back;
Forward;
Stop;
Refresh;
Home;
Search;
History;
Print;
Mail; and
Edit.

12. A computer system as recited in claim 1, wherein the graphical user interface further comprises an address bar identifying an address for the Web page being displayed by the Web browser in the browser pane.

13. A computer system as recited in claim 1, wherein the graphical user interface further comprises a status bar showing a current status for the Web page.

14. A method of managing streaming media on a computer system having a speaker for playing streaming media and a display device for rendering a graphical user interface of a Web browser, the graphical user interface of the Web browser including a radio toolbar, the method comprising:
launching an instance of the Web browser;
creating a radio client upon the launching of the Web browser;
determining if a radio server is running;
creating an instance of the radio server if the radio server was not previously running;
establishing a shared memory on the computer system between the radio client and the radio server to maintain a current playback-state of the radio server;
retrieving a URL to a radio station from the shared memory;
requesting that the radio server stream content of the radio station; and
via the radio toolbar:
disabling a play/stop button if streaming media is not available from the radio server;
if streaming media is available, enabling the play/stop button for selection, wherein toggling between play and stop causes playing and stopping, respectively, of available streaming media;
if the computer system can modify streaming media playback volume, activating a mute button and a volume slider, otherwise inactivating the mute button and the volume slider;
presenting a drop-down list that includes an entry to add favorites and a list of recently used radio stations upon user selection of a radio-stations button; and
displaying in an information area, components comprising a status text component and a status icon component, the status text component presenting meta data information associated with a streaming media source and the status icon component presenting an Internet connection status regarding the streaming media source.

15. A method as recited in claim 14, further comprising:
receiving a user instruction through the radio toolbar regarding streaming content from the radio station;
forwarding the user instruction from the client to the server; and
executing the instruction at the server.

16. A method as recited in claim 14, wherein the user instruction is associated with a radio toolbar function selectable from the group comprising:
playing the streaming content;
stopping the streaming content;
muting the streaming content; and
changing the volume of the streaming content.

17. In a computer system having a speaker for playing streaming media and a display device for rendering a graphical user interface of a Web browser, the graphical user interface of the Web browser including a radio toolbar having a play/stop button, a mute button, a volume slider, a radio-stations button, and an information status area, a method comprising:
establishing a shared memory on the computer system between a radio client and a radio server to maintain a current playback-state of the radio server:
disabling the play/stop button on the radio toolbar if streaming media is not available from the radio server;
if streaming media is available, enabling the play/stop button to toggle between play and stop upon user selection of the play/stop button, wherein toggling between play and stop causes playing and stopping, respectively, of available streaming media;
inactivating the mute button if the computer system cannot modify streaming media playback volume and activating the mute button otherwise;
inactivating the volume slider if the computer system cannot modify streaming media playback volume and activating the volume slider to control the streaming media playback volume otherwise;
presenting a drop-down list that includes an "add station to favorites" entry and a list of recently used radio stations upon user selection of the radio-stations button; and
displaying in the information area, a status text component and a status icon component, the status text component presenting meta data information associated with a streaming media source, the status icon component presenting an Internet connection status regarding the streaming media source.

18. A method as recited in claim 17, wherein the graphical user interface includes a cursor controllable by a user to select radio-toolbar buttons, the method further comprising:
while the cursor passes over a radio-toolbar button, highlighting that radio-toolbar button; and
displaying a rollover tool tip describing a corresponding function of the highlighted radio-toolbar button.

19. A method as recited in claim 18, wherein the displaying a rollover tool tip comprises:
displaying "play" when the play/stop button is toggled to stop;
displaying "stop" when the play/stop button is toggled to play;
displaying "mute" when the mute button is active
displaying "volume control" when the volume slider is active; and
displaying "radio station" when the radio-stations button is active.

20. A method as recited in claim 17, further comprising:
presenting an "add to favorites" dialog box in response to a user selection of the "add station to favorites" entry in the drop-down list; and
allowing the user to add a currently playing streaming media source to a favorites folder through the "add to favorites" dialog box.

21. A method as recited in claim 17, further comprising:
loading a radio station into the radio toolbar in response to a user selection from the list of recently used radio stations presented in the drop-down list.

* * * * *

UNITED STATES PATENT AND TRADEMARK OFFICE
CERTIFICATE OF CORRECTION

| | | |
|---|---|---|
| PATENT NO. | : 7,788,597 B1 | |
| APPLICATION NO. | : 09/411171 | |
| DATED | : August 31, 2010 | |
| INVENTOR(S) | : Khurshed Mazhar et al. | |

It is certified that error appears in the above-identified patent and that said Letters Patent is hereby corrected as shown below:

In column 13, line 26, in Claim 17, delete "server:" and insert -- server; --, therefor.

Signed and Sealed this
Eighth Day of February, 2011

David J. Kappos
*Director of the United States Patent and Trademark Office*